United States Patent
Park et al.

(10) Patent No.: US 11,724,670 B2
(45) Date of Patent: Aug. 15, 2023

(54) DEVICE FOR DISTRIBUTING WASHER FLUID

(71) Applicants: Hyundai Motor Company, Seoul (KR); Kia Motors Corporation, Seoul (KR); DY AUTO Corporation, Chungcheongnam-do (KR)

(72) Inventors: Jong Min Park, Seoul (KR); Nak Kyoung Kong, Gyeonggi-do (KR); Seung Sik Han, Gyeonggi-do (KR); Ki Hong Lee, Seoul (KR); Jong Wook Lee, Chungcheongnam-do (KR)

(73) Assignees: Hyundai Motor Company, Seoul (KR); Kia Motors Corporation, Seoul (KR); DY Auto CORP, Ansan (KR)

( * ) Notice: Subject to any disclaimer, the term of this patent is extended or adjusted under 35 U.S.C. 154(b) by 233 days.

(21) Appl. No.: 17/036,975

(22) Filed: Sep. 29, 2020

(65) Prior Publication Data

US 2021/0380073 A1    Dec. 9, 2021

(30) Foreign Application Priority Data

Jun. 3, 2020   (KR) ........................ 10-2020-0066916

(51) Int. Cl.
*B60S 1/48*    (2006.01)
*B60S 1/52*    (2006.01)

(52) U.S. Cl.
CPC .................. *B60S 1/481* (2013.01); *B60S 1/52* (2013.01)

(58) Field of Classification Search
None
See application file for complete search history.

(56) References Cited

U.S. PATENT DOCUMENTS

| | | | | |
|---|---|---|---|---|
| 2,312,187 | A * | 2/1943 | Patterson | B60S 1/52 239/284.1 |
| 4,679,983 | A * | 7/1987 | Pietryk | F04D 15/0016 415/152.2 |
| 6,478,241 | B1 * | 11/2002 | Guo | B05B 1/1672 239/242 |
| 9,227,207 | B1 * | 1/2016 | Bredberg | A01G 25/00 |
| 9,578,885 | B1 * | 2/2017 | Glascock | A23B 4/12 |
| 2003/0121553 | A1 * | 7/2003 | Kuo Liao | F16K 11/056 137/625.4 |

(Continued)

FOREIGN PATENT DOCUMENTS

| | | | | |
|---|---|---|---|---|
| DE | 102012103838 A1 * | 11/2013 | | A01C 23/007 |
| DE | 102016004705 A1 * | 10/2017 | | F16K 11/0873 |

(Continued)

*Primary Examiner* — Spencer E. Bell
*Assistant Examiner* — Omair Chaudhri
(74) *Attorney, Agent, or Firm* — Fox Rothschild LLP

(57) ABSTRACT

A device for distributing washer fluid includes a cover portion into which a washer fluid is introduced, a moving shaft assembly located inside the cover portion, a motor assembly located at one end of the moving shaft assembly and configured to rotate the moving shaft assembly, one or more flow holes located in the moving shaft assembly, a plurality of distribution units located to correspond to the one or more flow holes, and a controller configured to control a rotation amount of the motor assembly which is configured to selectively discharge an washer fluid introduced into the one or more flow holes to the plurality of distribution units.

11 Claims, 4 Drawing Sheets

(56) References Cited

U.S. PATENT DOCUMENTS

| | | | | |
|---|---|---|---|---|
| 2006/0064837 A1* | 3/2006 | Mayo | ................... | B60S 1/52 |
| | | | | 15/250.1 |
| 2006/0256459 A1* | 11/2006 | Izabel | ................... | B60S 1/56 |
| | | | | 359/872 |
| 2012/0048411 A1* | 3/2012 | Steyer | ................ | F16K 11/0856 |
| | | | | 137/625 |
| 2014/0082873 A1* | 3/2014 | Huth | ................... | B60K 37/02 |
| | | | | 15/250.01 |
| 2015/0041007 A1* | 2/2015 | Kawasaki | ......... | F16K 31/52416 |
| | | | | 137/625.11 |
| 2015/0182099 A1* | 7/2015 | Yoo | ................... | A47L 15/4282 |
| | | | | 134/198 |
| 2015/0260298 A1* | 9/2015 | Poggel | ................ | F16K 11/02 |
| | | | | 137/625 |
| 2015/0344001 A1* | 12/2015 | Lopez Galera | ........... | B60S 1/56 |
| | | | | 134/198 |
| 2016/0354792 A1* | 12/2016 | Su | ................... | B05B 3/044 |
| 2017/0320074 A1* | 11/2017 | Becktell | ................ | B05B 1/3026 |
| 2017/0369035 A1* | 12/2017 | Bokobza | ................ | A46B 13/06 |
| 2018/0119836 A1* | 5/2018 | Ozeki | ................... | F16K 11/085 |
| 2018/0178238 A1* | 6/2018 | Farra | ................... | B05B 15/652 |
| 2019/0168244 A1* | 6/2019 | Ye | ................... | B05B 3/044 |
| 2019/0248338 A1* | 8/2019 | Singer | ................ | B60W 50/085 |
| 2020/0031696 A1* | 1/2020 | Friese | ................ | C02F 3/1268 |
| 2020/0317160 A1* | 10/2020 | Albrecht | ................ | F16K 27/003 |
| 2021/0197221 A1* | 7/2021 | Rachow | ................... | B05B 1/20 |
| 2021/0197769 A1* | 7/2021 | Shirakura | ............... | B60S 1/486 |

FOREIGN PATENT DOCUMENTS

| | | | | |
|---|---|---|---|---|
| GB | 2563500 A | * | 12/2018 | ............... B05B 1/16 |
| KR | 2009-0047963 A | | 5/2009 | |
| WO | 2018/059793 A1 | | 4/2018 | |
| WO | WO-2018077348 A1 | * | 5/2018 | |

\* cited by examiner

DEVICE FOR DISTRIBUTING WASHER FLUID

CROSS-REFERENCE TO RELATED APPLICATION

This application claims under 35 U.S.C. § 119(a) the benefit of Korean Patent Application No. 10-2020-0066916 filed on Jun. 3, 2020, the entire contents of which are incorporated herein by reference.

BACKGROUND

(a) Technical Field

The present disclosure relates to a device for distributing washer fluid, more particularly, to the device for distributing washer fluid, which includes a plurality of distribution units which are sequentially engaged and performs control of a motor assembly rotating a moving shaft assembly so as to distribute the washer fluid.

(b) Description of the Related Art

Conventionally, a washer pump system is mounted on a vehicle to selectively supply washer fluid in a washer tank to a front windshield or a rear windshield.

Since surfaces of the windshields are frequently contaminated with foreign materials such as dust and the like, in order to sufficiently secure a front view and achieve safe operation, the foreign materials such as dust and the like on the surfaces of the windshields should be removed.

As described above, in order to remove the foreign materials and the like on the windshields of the vehicle, the vehicle is provided with washer nozzles for spraying washer fluid together with a wiper system.

Therefore, when a driver operates a washer switch installed in a driver seat so as to clear a field of view, a washer motor in conjunction with the washer switch operates, and the washer fluid stored in a washer fluid storage tank is sprayed to the windshields through the washer nozzle due to an operation of the washer motor. Through the sprayed washer fluid and a wiper operation, the foreign materials hindering driving are removed so that the driver can safely drive in a state in which the field of view is secured.

However, in recent years, when pollutants are attached to various devices (e.g., a camera, radio detecting and ranging (RADAR), light detecting and ranging (LiDAR), and the like) which are coupled to an outer side of the vehicle for autonomous driving, there occurs a problem in measuring data for performing the autonomous driving. Stability of the vehicle is significantly threatened by such devices which are impossible to measure data.

Therefore, a device for distributing a washer fluid sprayed to various positions is required.

SUMMARY

In one aspect, the present disclosure provides a device for distributing washer fluid, which includes a plurality of flow paths through a single water pump.

In another aspect, the present disclosure provides a device for distributing washer fluid, which includes discharge holes of a moving shaft assembly configured to correspond to distribution units and in which the discharge holes are located at positions corresponding to the distribution units through rotation of a moving shaft.

Objectives of the present disclosure are not limited to the above-described objectives, and other objectives of the present disclosure, which are not mentioned, can be understood by the following description and also will be apparently understood through embodiments of the present disclosure. Further, the objectives of the present disclosure can be implemented by means described in the appended claims and a combination thereof.

In an exemplary embodiment, the present disclosure provides a device for distributing washer fluid to a windshield of a vehicle, which includes a cover portion into which a washer fluid is introduced, a moving shaft assembly located inside the cover portion, a motor assembly located at one end of the moving shaft assembly and configured to rotate the moving shaft assembly, one or more flow holes located in the moving shaft assembly, a plurality of distribution units located to correspond to the one or more flow holes, and a controller configured to control a rotation amount of the motor assembly which is configured to selectively discharge an washer fluid introduced into the one or more flow holes to the plurality of distribution units.

In addition, the one or more flow holes may correspond in number to the plurality of distribution units, and the one or more flow holes may be spaced at a same angle based on a diameter of the moving shaft assembly.

In addition, the moving shaft assembly may further include an introduction portion which protrudes outward from the cover portion and into which the washer fluid is introduced.

In addition, the moving shaft assembly may include a tube-shaped moving shaft into which the washer fluid is introduced, and an engagement portion provided at one end of the moving shaft and engaged with the motor assembly.

In addition, each of the plurality of distribution units may include a housing including a through-hole configured to allow the moving shaft assembly to pass there through, a discharge nozzle configured to allow the introduced washer fluid to be discharged, and a sealing portion configured to surround the through-hole.

In addition, the controller may receive a cleaning request signal of a vehicle and rotate the moving shaft assembly such that a flow hole may correspond to a distribution unit corresponding to the request signal.

In addition, the cleaning request signal may be received from a driving assist device located outside a vehicle.

In addition, the driving assist device may include one or more among a camera, a light detecting and ranging (LiDAR), a radio detecting and ranging (RADAR), and a camera monitoring system.

In addition, the device may further include a fixing pin located at one end of a distribution unit which is located close to a driving part, and a stopper located at one end of the moving shaft assembly adjacent to the driving part.

In addition, the controller may be configured to set an initial position at which the stopper is in contact with the fixing pin.

In addition, when cleaning requests of a plurality of driving assist devices are received, the controller may be configured to clean a driving assist device in advance which is essentially required for a driving condition of the vehicle.

Other aspects and preferred embodiments of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given herein below by way of illustration only, and thus are not limitative of the present disclosure, and wherein.

Figure 1:
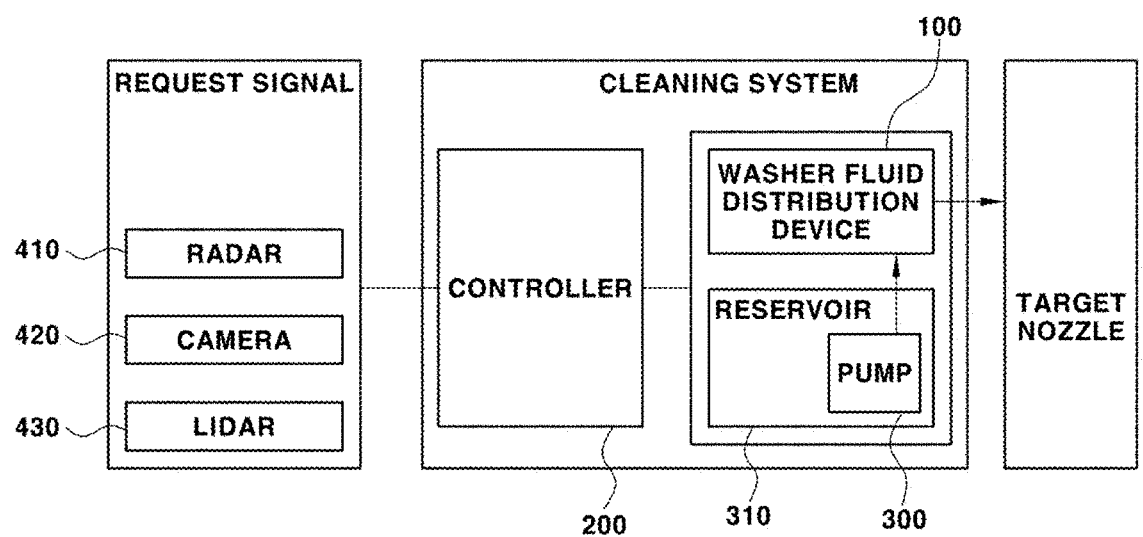
FIG. 1 is a block diagram illustrating a system including a device for distributing a washer fluid according to one embodiment of the present disclosure.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present disclosure will be described in detail with reference to the accompanying drawings. The embodiments of the present disclosure can be modified in various forms, and the scope of the present disclosure should not be construed as being limited to the following embodiments. These embodiment are provided to more fully describe the present disclosure to those skilled in the art.

Further, in this specification, the terms an upper portion, a lower portion, and the like are assigned to components so as to discriminate these components because names of the components are the same, but these terms are not necessarily limited to the order in the following description.

The present disclosure relates to a washer fluid distribution device 100 and provides a technique for distributing washer fluid to various driving assist devices located on an outside of a vehicle and contaminated by pollutants.

The driving assist device located outside the vehicle may include a camera 420 or a camera monitoring system for providing one or more images among a front image, a rear image, and a side image of the vehicle, and a light detecting and ranging (LiDAR) 430 and a radio detecting and ranging (RADAR) 410 for receiving driving information.

More preferably, for example, the LiDAR 430, which receives driving information of the vehicle so as to perform autonomous driving, is connected to a LiDAR device which is a sensor. The LiDAR device may include a laser transmission module, a laser detection module, a signal collection and processing module, and a data transmission/reception module. Laser light sources having wavelengths in a wavelength range of 250 nm to 11 μm or capable of varying their wavelengths are used. Further, the LiDAR device is classified into a time of flight (TOF) type LiDAR device and a phase shift type LiDAR device according to a signal modulation method.

The LiDAR 430 controls the LiDAR device and other devices connected to the LiDAR device (e.g., a LiDAR processor (not shown) for processing a LiDAR sensing output). For example, such control includes power supply control, reset control, clock (CLK) control, data communication control, memory control, and the like. Meanwhile, the LiDAR device is used to sense a front area of the vehicle. Such a LiDAR device is located on a front surface inside the vehicle, specifically, below a front windshield to transmit and receive laser light through the front windshield.

In addition, for example, the RADAR 410 is connected to a RADAR) device which is a sensor. The RADAR device is a sensor device for measuring a distance, a speed, and an angle of an object using electromagnetic waves. When the RADAR device is used, an object in a front side up to 150 m in a horizontal angle range of 30 degrees may be detected using a frequency modulation carrier wave (FMCW) method or a pulse carrier method. The RADAR 410 controls the RADAR device and other devices connected to the RADAR device (e.g., a RADAR processor (not shown) for processing a RADAR sensing output).

As described above, when contaminants are attached to not only the camera 420 and the camera monitoring system but also the LiDAR 430 and the RADAR 410, it is impossible to receive driving environment information in an autonomous driving condition of the vehicle, and a structure of a spray device capable of spraying an washer fluid onto each device is indispensably required.

In addition, the present disclosure provides a washer fluid distribution device 100 for selectively spraying a washer fluid to a plurality of paths through a single distribution device.

Figure 2:
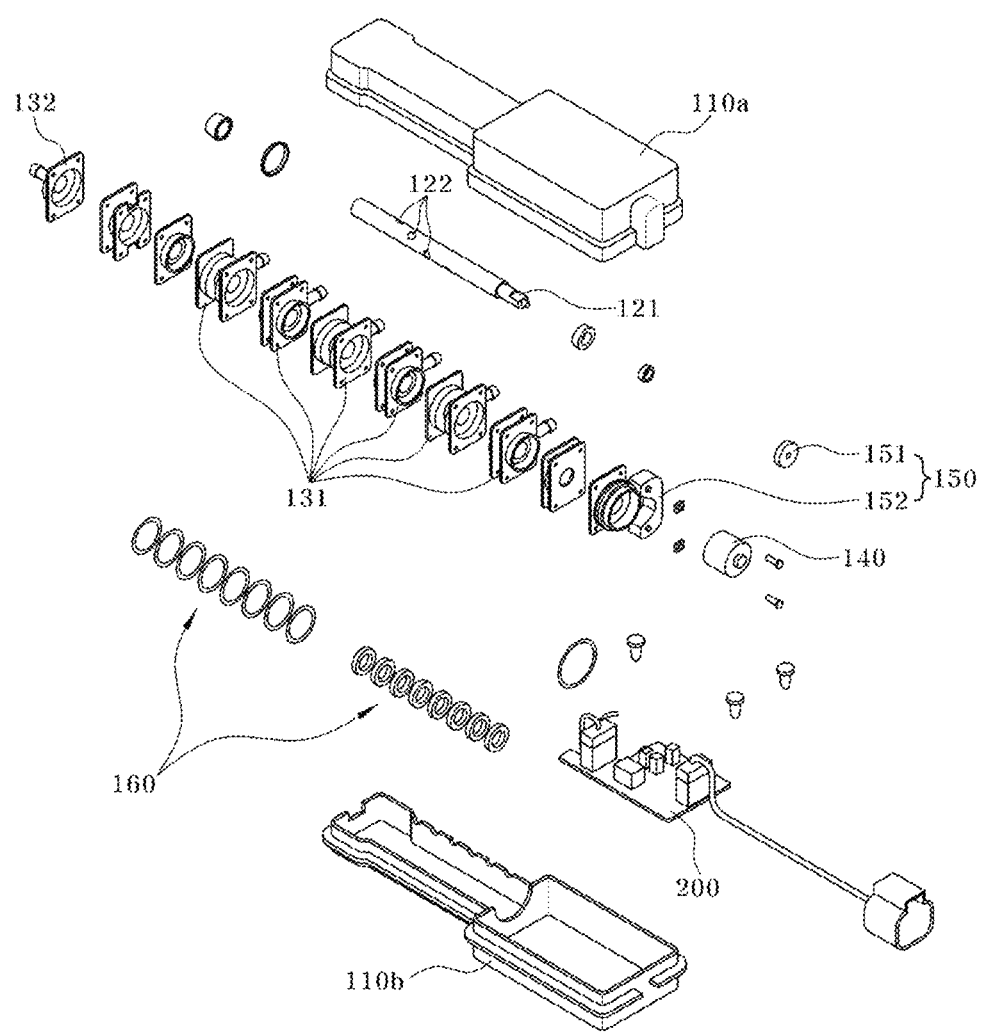
FIG. 2 is a configurational diagram illustrating the device for distributing a washer fluid according to one embodiment of the present disclosure.

FIGS. 1 and 2 are a block diagram and a configurational diagram illustrating the washer fluid distribution device 100 according to the present disclosure.

As shown in FIGS. 1 and 2, the washer fluid distribution device 100 includes a cover portion 110 which accommodates a combination of one or more distribution units 131 and is configured to be fluidly connected from the distribution units 131 to selectively spray a washer fluid to each device. More preferably, the cover portion 110 includes an upper cover 110a and a lower cover 110b and is configured to accommodate the distribution units 131, a moving shaft assembly 120, and a motor assembly 140.

In one embodiment of the present disclosure, six distribution units 131 are provided, and each of the six distribution units 131 is configured to be fluidly connected to each mechanism requiring a washer fluid spray in response to a request signal received by a controller 200.

Each distribution unit 131 including a hollow is located, and the moving shaft assembly 120 located in the hollow is disposed. A introduction portion 132 is configured to protrude to an outer side of the cover portion 110 at one end of the moving shaft assembly 120 so as to the washer fluid to be introduced there into, and the moving shaft assembly 120 includes flow holes 122 corresponding to the number of the distribution units 131 so as to allow a washer fluid introduced in a length direction of the moving shaft assembly 120 to be selectively moved through each distribution unit 131.

The introduction portion 132 is a component which is fluidly connected to the moving shaft assembly 120 and may be formed coaxially with the moving shaft 121 but include all forms being fluidly connectable.

Each flow hole 122 may be selectively switched to a position corresponding to each distribution unit 131 which is configured in the length direction of the moving shaft assembly 120. Thus, in one embodiment according to the present disclosure, six flow holes 122 are located to be spaced at a predetermined interval from each other in the length direction of the moving shaft assembly 120. In one embodiment according to the present disclosure, the washer fluid distribution device 100 formed of six distribution units 131 includes the moving shaft assembly 120 having six flow holes 122, and the six flow holes 122 are formed to have an interval of 60 degrees with respect to each other based on a central axis of the moving shaft 121.

The one end of the moving shaft assembly 120 is engaged with the motor assembly 140. In addition, a pulse current is applied to the motor assembly 140 according to a rotation amount applied from the controller 200 and the moving shaft assembly 120 is rotated so that the distribution unit 131 fluidly connected to the driving assist device, for which cleaning is required, and the flow hole 122 are located to face each other. Thus, a washer fluid introduced through the introduction portion 132 is discharged through the selected distribution unit 131.

When a plurality of cleaning requests with respect to the driving assist device are received, the controller 200 is configured to distribute the washer fluid in advance to a corresponding distribution unit 131 to mitigate the risk of driving. In one embodiment of the present disclosure, the washer fluid distribution device 100 may be controlled such that the washer fluid is preferentially distributed to the RADAR 410 and the LiDAR 430 in an autonomous driving environment of the vehicle and is preferentially distributed to the camera monitoring system and the windshield glasses in a manual driving mode.

That is, the controller 200 is controlled to determine a driving condition of the vehicle and perform cleaning of the driving assist device, which may be used to determine the driving condition, in advance.

The introduction portion 132 located at the other end of the moving shaft assembly 120 is configured to be fluidly connected to a washer fluid reservoir 310 (not shown) and allow the washer fluid to be introduced into the introduction portion 132 through a washer pump 300 between the washer fluid reservoir 310 and the introduction portion 132.

Since the distribution units 131 are configured to be located adjacent to each other in the cover portion 110 and to be engaged with each other, the number of distribution units 131 may be set according to a selection of a user. The distribution unit 131 includes an insertion portion 133 configured to be inserted into a distribution unit 131 adjacent thereto, and a hook groove located in the adjacent distribution unit 131 to fix the insertion portion 133.

Therefore, engagement between the insertion portion 133 and the hook groove is made between two adjacent distribution units 131 so that the two adjacent distribution units 131 are configured to be fixed to each other. In addition, a sealing portion may be included between the insertion portion 133 and the hook groove so that water leak generated from a coupling between the distribution units 131 may be prevented.

The sealing portion according to the present disclosure may include an O-ring located on one surface of the distribution unit 131 and an X-ring located on the other surface thereof and is configured to seal both sides of the distribution unit 131. Thus, the washer fluid introduced through the introduction portion 132 may be discharged to a discharge hole of the distribution unit 131 corresponding to the flow hole 122.

The controller 200 may measure current values applied to the washer pump 300 and the motor assembly 140 and times during which currents are applied thereto and receive an ambient temperature value from a temperature sensor located in the washer fluid distribution device 100.

In addition, in an autonomous driving condition of the vehicle, the controller 200 may receive cleaning request signals with respect to the camera 420, the camera monitoring system, the LiDAR 430, the RADAR 410, and the like. More preferably, when driving information measured by the camera 420, the LiDAR 430, or the RADAR 410 is less than a predetermined value, the controller 200 may be controlled to automatically spray the washer fluid to a corresponding device.

In addition, the controller 200 is configured to receive rotation information on the moving shaft assembly 120 and set an initial position of the moving shaft assembly 120. In setting the initial position of the moving shaft assembly 120, the controller 200 is configured to first rotate a stopper 154 located in an engagement portion 150 to a set position and then to rotate the stopper 154 to a position corresponding to a distribution unit 131 located at a central portion among the plurality of distribution units 131. That is, an initial position of the moving shaft 121 may be set to the position corresponding to the distribution unit 131 located at the central portion.

More preferably, the engagement portion 150 includes a gear 151 configured to receive a driving force from the motor assembly 140, and a support 152 including a fixing pin 153 configured to allow the gear 151 to be located, allow the stopper 154 to be rotated and moved on a flat surface, and set an initial position of the stopper 154.

Thus, as the stopper 154 of the motor assembly 140 is rotated, the moving shaft assembly 120 engaged with one end of the motor assembly 140 is configured to be integrally rotated.

In addition, the controller 200 may be configured to compensate for current values applied to the motor assembly 140 and the water pump 300 and times during which the current values are applied thereto according to a variation in temperature condition through a temperature sensor located in the washer fluid distribution device 100.

As described above, since the compensation for the current values and the times during which the current values are applied is performed in response to the variation in temperature condition, a revolution per minute and a torque value of the water pump 300 are consistently maintained so that a discharge pressure of the washer fluid introduced through the introduction portion 132 is controlled to not be varied.

In addition, even when an ambient temperature of the washer fluid distribution device 100 varies, a pulse voltage and a time, which are applied through the motor assembly 140, are compensated for so that a rotation amount of the moving shaft assembly 120 may be consistently maintained.

The moving shaft assembly 120 is rotated in a clockwise direction or a counterclockwise direction based on the initial position thereof such that the selected distribution unit 131 and the discharge hole 122 corresponding thereto face each other.

More preferably, the controller 200 is configured to control the pulse input of the motor assembly 140 to allow the moving shaft assembly 120 to be rotated from the set position to the initial position and configured to store the controlled pulse input. The set position disclosed in the present disclosure means a position at which the flow hole 122 corresponding to the distribution unit 131 located close to the central portion among the distribution units 131 located in the length direction of the moving shaft 121 is fluidly connected, and the initial position disclosed herein means a position which becomes a reference for which the fixing pin 153 is in contact with the stopper 154.

As described above, since the initial position of the moving shaft assembly 120 is located at the position corresponding to the flow hole 122 which corresponds to the distribution unit 131 adjacent to a center of the moving shaft assembly 120 in the length direction, it is configured to minimize a delay time due to the rotation of the moving shaft assembly 120 according to a bidirectional rotation of the motor assembly 140.

In one embodiment of the present disclosure, the moving shaft assembly 120 is configured to be moved from the set position to the initial position when a starting is turned on or power is applied, and thus the motor assembly 140 applies pulse power to move the moving shaft assembly 120 from the set position to the initial position.

In order to rotate the moving shaft assembly 120 from the set position to the initial position, the controller 200 is configured to store the number of pulse powers applied from the motor assembly 140 and an application time thereof.

In a state in which a current is applied from the controller 200 to the motor assembly 140, the controller 200 is configured to measure a rate of change in current of the water pump 300. Consequently, the controller 200 is configured to determine whether the washer fluid distribution device 100 fails. The rate of change in current of the water pump 300, which is to be measured, is a concept including both of a current value being applied and a time during which the current value is applied.

When the current value applied to the water pump 300 or the motor assembly 140, which is introduced into the washer fluid distribution device 100, is increased, the controller 200 determines that the washer fluid distribution device 100 fails. In addition, when a failure occurs, the controller 200 resets the moving shaft assembly 120 from the set position to the initial position and reattempts discharge of the washer fluid to the same distribution unit 131. In a state of reattempting the discharge of the washer fluid, when a restricted current value applied to the water pump 300 or the motor assembly 140 exceeds a preset restricted current value, the controller 200 is configured to switch to a protection mode (power off) so as to interrupt the driving of the motor assembly 140 and configured to transmit the failure to the user.

Figure 3:
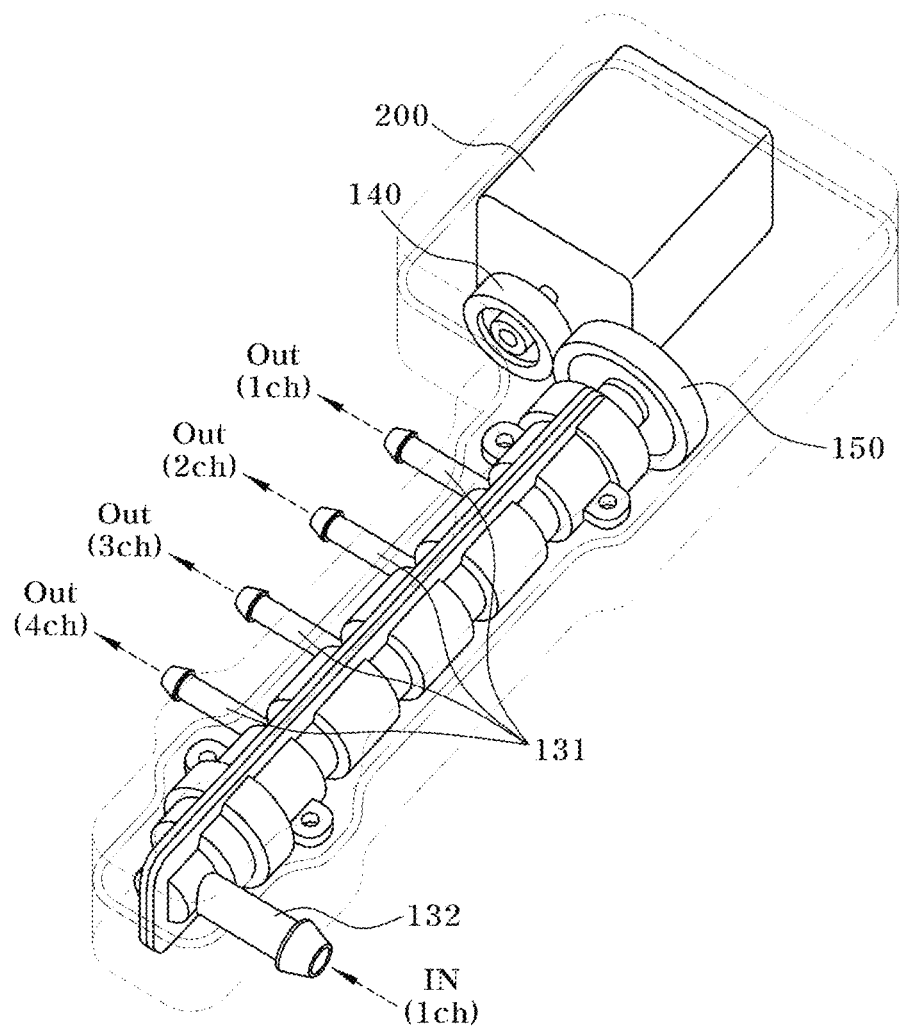
FIG. 3 is a perspective view illustrating a driving relationship of the device for distributing a washer fluid according to one embodiment of the present disclosure.

FIG. 3 illustrates the washer fluid distribution device 100 according to one embodiment of the present disclosure.

As shown in FIG. 3, the washer fluid distribution device 100 includes an introduction portion 132 located to protrude outward from the cover portion 110, and the introduction portion 132 is fluidly connected to the washer fluid reservoir 310 to allow a washer fluid compressed through the water pump 300 to be introduced into the washer fluid distribution device 100.

In addition, according to one embodiment of the present disclosure, four different distribution units 131 are included, and it is configured such that the washer fluid is discharged through at least one distribution unit 131 among the four different distribution units 131 according to a rotation amount of the moving shaft assembly 120.

The controller 200 is configured to receive a cleaning request signal and rotate the flow hole 122 to allow the washer fluid to be sprayed to a device corresponding to the received cleaning request signal. The engagement portion 150 located at the one end of the moving shaft assembly 120 is located and engaged with the motor assembly 140, and the controller 200 is configured to control the rotation amount of the motor assembly 140.

More preferably, the moving shaft assembly 120 includes the moving shaft 121 which is fluidly connected to the introduction portion 132 by passing through the distribution unit 131 and into which the washer fluid is introduced, and the engagement portion 150 located at one end of the moving shaft 121.

The engagement portion 150 located at the one end of the moving shaft 121 includes a support 152, and a fixing pin 153 is located on one surface of the support 152. In addition, the stopper 154 integrally rotated with the moving shaft 121 on a flat surface of the support 152 is configured to be rotated coplanar with the engagement portion 150.

Therefore, in order to set the initial position, the stopper 154 is configured to be switched to a state of being in contact with the fixing pin 153 and then to be rotated by the motor assembly 140, thereby setting the initial position and the set position of the moving shaft assembly 120 or resetting a position of the moving shaft 121.

Figure 4:
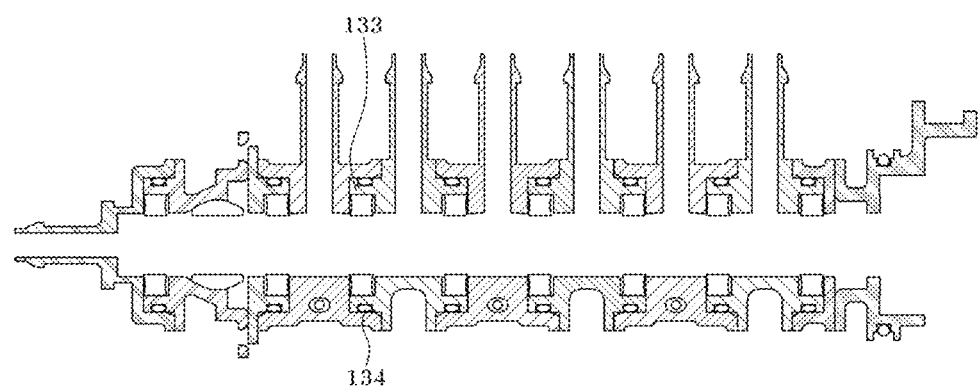
FIG. 4 is a cross-sectional view illustrating a coupling relationship between distribution units of the device for distributing a washer fluid according to one embodiment of the present disclosure.

FIG. 4 is a cross-sectional view illustrating the distribution units 131 of the washer fluid distribution device 100 according to one embodiment of the present disclosure.

As shown in FIG. 4, each of the distribution units 131 is configured to be located in the cover portion 110 and to be moved with a nozzle of the driving assist device, and interiors of the distribution units 131 are configured to allow the moving shaft 121 to be rotated.

An insertion portion 133 is located at one end of the distribution unit 131 which is engaged with an adjacent distribution unit 131, and a hook protrusion 134 is provided at the one end of the distribution unit 131 adjacent to the insertion portion 133. In the present embodiment according to the present disclosure, since five distribution units 131 are engaged with distribution units 131 adjacent thereto, the insertion portion 133 is inserted into the hook protrusion 134 and located therein.

Sealing portions 160 are included between the distribution units 131 and between the insertion portion 133 and the hook protrusion 134. Each of the sealing portions 160 may include an O-ring located in one of two adjacent distribution units 131 and an X O-ring located in the other one of the two adjacent distribution units 131.

Each distribution unit 131 may be configured by being engaged with an adjacent distribution unit 131. In one embodiment of the present invention, an engaged configuration of the five distribution units 131 including distribution holes is illustrated. However, the number of distribution units 131 may be changed, and a size of the cover portion 110 may be determined according to the changed number of distribution units 131.

Figure 5:
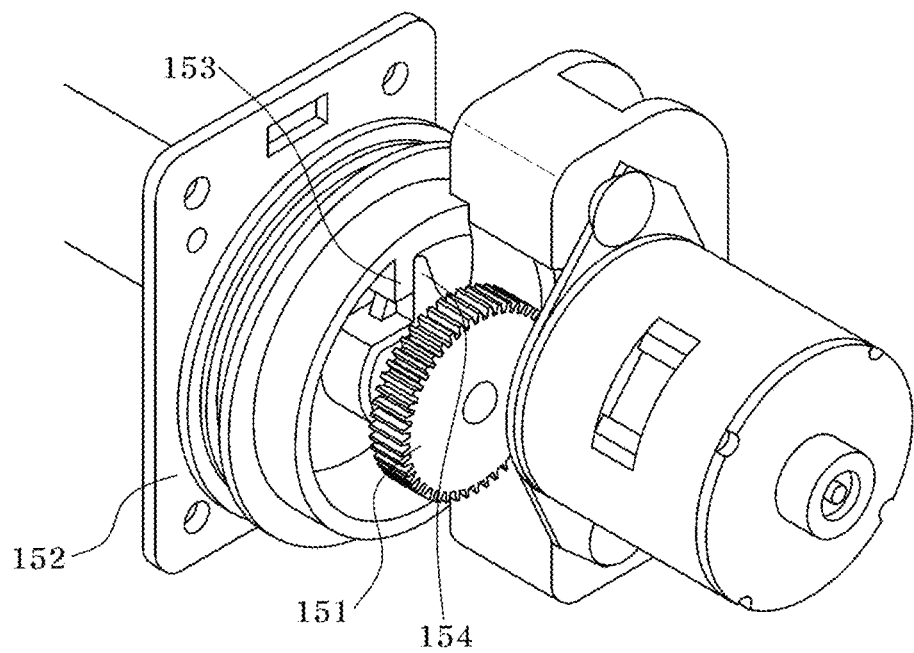
FIG. 5 is an enlarged view illustrating a driving part of the device for distributing a washer fluid according to one embodiment of the present disclosure.

FIG. 5 illustrates a configuration of the engagement portion 150 located at the one end of the moving shaft assembly 120 to rotate the moving shaft 121, and the motor assembly 140 interlocked with the engagement portion 150.

The engagement portion 150 includes the support 152 located at the one end of the engagement portion 150 to allow the moving shaft 121 to be rotated, and the gear 151 and the stopper 154 passing through the support 152 and located at a distal end of the moving shaft 121.

The support 152 includes a flat member configured to fix a motor, and the motor assembly 140 is configured to be engaged with the flat member. In addition, the gear 151 is included on one surface of the support 152 in which the motor assembly 140 is located so that the gear 151 is engaged with the motor assembly 140 so as to allow a rotating force of the motor assembly 140 to be applied thereto.

One surface of the support 152 through which the moving shaft 121 passes is configured to include the fixing pin 153. More preferably, the fixing pin 153 is configured to be located on a flat surface coplanar with the stopper 154 which is configured to be integrally rotated with the moving shaft 121.

Therefore, the controller 200 is configured to control a voltage applied to the motor assembly 140 to rotate the stopper 154. Thus, a position at which the stopper 154 is in contact with the fixing pin 153 is set as the initial position of the moving shaft 121. When a voltage change value applied to the motor assembly 140 or the water pump 300 is present, the controller 200 is configured to determine the washer fluid distribution device 100 as failing and switch to the initial position at which the stopper 154 is in contact with the fixing pin 153, thereby resetting the position of the moving shaft 121.

The present disclosure can obtain the following effects according to a combination of the above-described embodiments and a configuration, which will be described below, and a use relationship.

The present disclosure has an effect of configuring a plurality of distribution units and controlling a selective position of a moving shaft so that a washer fluid is sprayed into various branches through driving of a motor assembly.

The foregoing detailed description illustrates the present disclosure. Further, the foregoing is intended to illustrate and describe the exemplary embodiments of the present disclosure, and the present disclosure may be used in various other combinations, modifications, and environments. That is, it is possible to practice alternations or modifications without departing from the scope of the present disclosure disclosed in this specification, equivalents, and/or the technical or knowledge scope in the art to which the present disclosure pertains. The described embodiments are intended to illustrate the best mode for carrying out the technical spirit of the present disclosure and required various modifications can be made in the specific applications and uses of the present disclosure. Therefore, the detailed description is not intended to limit the present disclosure as in the disclosed embodiments. Further, it should be construed that the appended claims are intended to include another embodiment.

What is claimed is:

1. A device for distributing washer fluid to a windshield of a vehicle, the device comprising:
   a cover portion into which a washer fluid is introduced;
   a moving shaft assembly located inside the cover portion and including a plurality of flow holes, wherein the flow holes are spaced apart from each other in a longitudinal direction of the moving shaft assembly and are offset from each other in a circumferential direction of the moving shaft assembly;
   a motor assembly located at one end of the moving shaft assembly and configured to rotate the moving shaft assembly;
   a plurality of distribution units disposed inside the cover portion to surround the moving shaft assembly, wherein each of the distribution units has a discharge nozzle configured to fluidly communicate with one of the flow holes; and
   a controller configured to control a rotation amount of the motor assembly which is configured to selectively discharge the washer fluid introduced into the moving shaft assembly to one of the plurality of distribution units through one of the plurality of flow holes, wherein the washer fluid is only discharged through a first distribution unit of the plurality of distribution units in a first position of the moving shaft assembly, and the washer fluid is only discharged through a second distribution unit of the plurality of distribution units in a second position of the moving shaft assembly.

2. The device of claim 1, wherein the plurality of flow holes correspond in number to the plurality of distribution units, and the plurality of flow holes are located to be spaced at a same angle based on a diameter of the moving shaft assembly.

3. The device of claim 1, wherein the moving shaft assembly further includes an introduction portion which protrudes outward from the cover portion and into which the washer fluid is introduced.

4. The device of claim 1, wherein the moving shaft assembly includes:

a tube-shaped moving shaft into which the washer fluid is introduced; and an engagement portion provided at one end of the moving shaft and engaged with the motor assembly.

5. The device of claim 1, wherein each of the plurality of distribution units includes:

a housing including a through-hole configured to allow the moving shaft assembly to pass therethrough; and a sealing portion configured to surround the through-hole.

6. The device of claim 1, wherein the controller receives a cleaning request signal of the vehicle and rotates the moving shaft assembly such that one of the flow holes corresponds to one of the plurality of distribution units corresponding to the request signal.

7. The device of claim 6, wherein the cleaning request signal is received from a driving assist device located outside the vehicle.

8. The device of claim 6, wherein the driving assist device includes one or more among a camera, a light detecting and ranging (LiDAR), a radio detecting and ranging (RADAR), and a camera monitoring system.

9. The device of claim 1, further comprising:

a fixing pin located at one end of one of the plurality of distribution units which is located close to the motor assembly; and a stopper located at one end of the moving shaft assembly adjacent to the motor assembly.

10. The device of claim 9, wherein the controller is configured to set an initial position at which the stopper is in contact with the fixing pin.

11. The device of claim 1, wherein, when cleaning requests of a plurality of driving assist devices are received, the controller is configured to clean a driving assist device in advance which is essentially required for a driving condition of the vehicle.

* * * * *